United States Patent [19]

Kettl

[11] Patent Number: 4,497,079
[45] Date of Patent: Feb. 5, 1985

[54] BEEHIVE AERATOR

[76] Inventor: Henry G. Kettl, 3930 Inez St., Beaumont, Tex. 77706

[21] Appl. No.: 542,253

[22] Filed: Oct. 12, 1983

[51] Int. Cl.³ .............................................. A01K 47/06
[52] U.S. Cl. ............................................................. 6/1
[58] Field of Search ............................ 6/1, 2 R, 4 R, 5

[56] References Cited

U.S. PATENT DOCUMENTS

| 783,079 | 2/1905 | Root ............................................ 6/1 |
| 1,911,466 | 5/1933 | Powell ........................................ 6/1 |
| 4,135,265 | 1/1979 | Van de Kerkhof ........................ 6/1 |

FOREIGN PATENT DOCUMENTS 1120783  3/1982  Canada ....................................... 6/1

Primary Examiner—Robert P. Swiatek
Attorney, Agent, or Firm—Harvey B. Jacobson

[57] ABSTRACT

An invertible beehive cover provides aeration at the top of a hive when supported in one position on the hive, suitable for hot weather, and provides substantially no aeration at the top of the hive when supported in the inverted position suitable for winter feeding.

10 Claims, 5 Drawing Figures

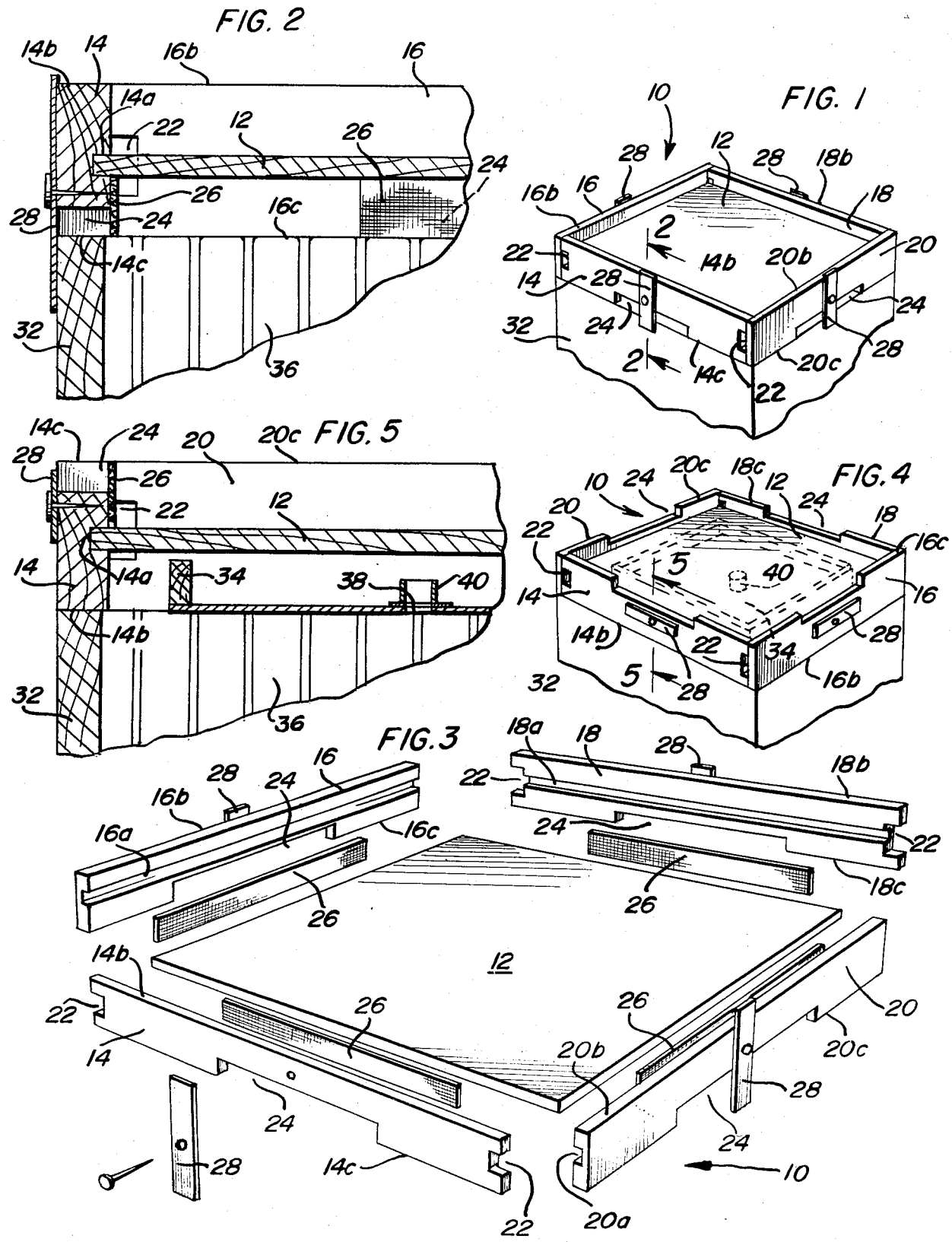

BEEHIVE AERATOR

BACKGROUND OF THE INVENTION

It is desirable to provide different conditions of ventilation at the top of a beehive under different atmospheric conditions. Thus, more ventilation is required during hot weather, for example, than during winter feeding periods. The present invention provides a beehive cover which can be adapted to provide more or less ventilation as required under different atmospheric conditions, and which may accommodate thereunder a feed pan at the top of the hive.

STATEMENT OF PRIOR ART

Applicant is aware of the following U.S. patents pertaining to beehive covers and the like. None of these patents, however, is believed to disclose the features of the present invention. U.S. Pat. Nos. 1,816,631, 2,373,805, 2,548,275, 2,530,801, 2,654,900, 2,709,820, 3,927,431.

SUMMARY OF THE INVENTION

The invention provides an invertible beehive cover which can be placed on a hive one way around to provide ventilation at the top of the hive, or which can be inverted and placed in the hive the other way around for decreased ventilation. The cover may, for example, comprise a peripheral frame having top and bottom edges, either of which is adapted to rest on the upper edge of the top beehive super, when the frame is one or the other way around, and a cover sheet filling the frame and connected to the frame at a location intermediate the top and bottom edges, the frame being provided with ventilating openings between the cover sheet and one of the edges only, so that when the cover is positioned on the top super with said one edge resting thereon, ventilation is provided at the top of the hive, and when the frame is positioned on the top super in inverted position, substantially no ventilation is provided. The depth of the frame is preferably sufficient to accommodate a feed tray under the cover sheet in both positions of the cover.

The invention accordingly provides a versatile cover for a beehive which allows a beekeeper to adjust conditions at the top of the hive to suit atmospheric conditions, simply by inverting the cover.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is a perspective view of a beehive cover in accordance with the invention placed on a hive in an aerating position.

FIG. 2 is a sectional view on line 2—2 of FIG. 1.

FIG. 3 is an exploded view of the cover.

FIG. 4 is a perspective view of the cover placed on the hive in a winter feeding position.

FIG. 5 is a sectional view on line 5—5 of FIG. 4.

DESCRIPTION OF PREFERRED EMBODIMENT

Referring initially to FIG. 3 in particular, an invertible cover 10 for a beehive is formed from a cover sheet 12, which may comprise for example ⅜" exterior grade plywood, and a peripheral rectangular frame comprising elongate wooden frame members 14, 16, 18, 20, each of which may be about one inch thick and about 2¾ inches deep. The frame members each have lengthwise grooves, denoted by respective "a" suffices for receipt of the respective edges of cover sheet 12, the grooves being located substantially centrally between the upper and lower edges of the frame members. The upper and lower edges of the frame members are denoted by "b" and "c" suffices respectively. The frame members may be connected together by conventional means, such as nails or staples, and water drain openings 22 may be provided at the corners of the frame.

Ventilating openings 24 are provided in each frame member between cover sheet 12 and the "c" edge of the respective frame member, the length of each opening being for example about eight inches, and its depth about ½". The ventilating openings may be covered on the interior surface of each frame member with a mesh sheet 26 to eliminate the need for guard bees at the openings, and as a ventilated restraint when used as a pollen trap. Pivoted latch members 28 are provided on the exterior of each frame member for locating the cover on the top of the hive, the latch members comprising, for example, strips of galvanized tin nailed to the frame.

The cover 10 is dimensioned to fit on the upper edge of the top super 32 of a beehive, either on the "b" edges of the frame members, or in inverted position on the "c" edges of the frame members. In either case, the latch members 28 may be oriented vertically to provide lateral location and retention of the cover.

When the cover is positioned on the "c" edges of the frame members, as shown in FIGS. 1 and 2, the ventilating openings 24 communicate with the top of the hive to provide aeration, so that this position of the cover is suitable for use in hot weather. When the cover is inverted, however, as shown in FIGS. 4 and 5, the ventilating openings are above cover sheet 12, so that there is substantially no ventilation at the top of the hive and this position of the cover is suitable for use in winter feeding. A shallow feed pan 34 for sugar may be provided below cover sheet 12 to rest on frames 36 of the top super. The pan has an opening 38 with a riser 40 allowing bees to enter from below, the opening being positioned over a space between adjacent frames of the top super. When the cover is inverted and used for aeration of the hive, the feed pan may be left in place and the riser covered with a block of wood. This will prevent burr cone formation in the feed pan.

The cover when in aerating position is found to provide increased airflow at the top of the hive eliminating clustering of bees on the outside of the hive during hot hours of the day, resulting in honey production throughout the entire day. Tests with the aerator have resulted in a 1% lower moisture content of honey compared to a normal beehive cover with restricted air circulation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A beehive cover comprising a peripheral frame adapted to fit over the top super of a beehive, a cover sheet filling the frame, and ventilating openings in the frame for providing aeration at the top of the hive, wherein the cover sheet is attached to the peripheral frame intermediate upper and lower edges of the frame, said ventilating openings being located between the cover sheet and one of said edges, the cover being invertible to fit over the top super with one or other of said edges being supported on the top super, the ventilating openings when said one of said edges is supported on the top super providing aeration for the top of the hive, and the aeration being substantially reduced when the cover is inverted with the other of said edges being supported on the top super.

2. The invention of claim 1 wherein the height of the frame between each of said edges and said cover sheet is sufficient to allow a feed tray to be supported at the top of a hive under the cover sheet when the cover is supported on either of said edges.

3. The invention of claim 1 wherein the frame is of rectangular form, and the ventilating openings comprise elongate slots on opposite sides of the frame.

4. The invention of claim 3 wherein the ventilating openings are covered with mesh internally of the frame.

5. The invention of claim 3 including drain openings at the corners of the frame.

6. The invention of claim 3 including pivotal latch elements on opposite sides of the frame for locating and retaining the cover on the top super of a hive.

7. A beehive cover capable of being supported on the top super of a hive in alternative mutually inverted positions, the cover including means for providing ventilation at the top of the hive when supported in one of said positions and substantially reduced ventilation at the top of the hive when supported in the other of said positions, said one position of the cover being suitable for hot weather and the other position of the cover being suitable for winter feeding, wherein the cover includes a peripheral frame adapted to the periphery of the top super of a beehive, and a cover sheet filling the frame, the cover sheet being attached to the frame intermediate upper and lower edges of the frame, and the means for providing ventilation comprising ventilation openings in the frame between the cover sheet and one of said edges, the frame being absent in ventilation openings between the cover sheet and the other of said edges.

8. The invention of claim 7 wherein the depth of the frame between the cover sheet and each of said edges is sufficient to allow a feed pan to be supported at the top of the hive under the cover sheet.

9. In combination with a beehive, a cover for support on the top super of the hive, the cover being capable of being supported on the top super in alternative mutually inverted positions, the cover including means for providing aeration at the top of the when supported in one of said positions and substantially no aeration at the top of the hive when supported in the other of said positions, wherein the cover comprises a peripheral frame and a cover sheet filling the frame and located intermediate top and bottom edges of the frame on one or the other of which edges the cover is supported on the top super of the hive in the respective alternative positions, the means for providing ventilation comprising ventilating openings in the frame between the cover sheet and one of said edges only.

10. The invention of claim 9 including a shallow feed pan for support in the top of the hive under said cover sheet.

* * * * *